(12) United States Patent
Bailey et al.

(10) Patent No.: US 7,005,062 B1
(45) Date of Patent: Feb. 28, 2006

(54) SELF-SUPPORTING PUMP-FILTER APPARATUS FOR ABOVE-GROUND SWIMMING POOLS

(75) Inventors: Thomas Bailey, Norfolk, VA (US); George Dieffenbach, Norfolk, VA (US); Gary Lawson, Norfolk, VA (US)

(73) Assignee: General Foam Plastics Corporation, Norfolk, VA (US)

( * ) Notice: Subject to any disclaimer, the term of this patent is extended or adjusted under 35 U.S.C. 154(b) by 69 days.

(21) Appl. No.: 10/621,248

(22) Filed: Jul. 16, 2003

Related U.S. Application Data

(60) Provisional application No. 60/396,185, filed on Jul. 16, 2002, provisional application No. 60/401,662, filed on Aug. 7, 2002.

(51) Int. Cl.
| | |
|---|---|
| B01D 27/06 | (2006.01) |
| B01D 35/02 | (2006.01) |
| C02F 1/76 | (2006.01) |
| B01J 8/06 | (2006.01) |

(52) U.S. Cl. .................. 210/169; 210/206; 210/437; 422/277

(58) Field of Classification Search .............. 210/169, 210/314–315, 198.1, 205, 206, 416.1, 416.2, 210/437, 483, 484, 488, 489, 493.1, 493.2; 137/268; 422/276, 277
See application file for complete search history.

(56) References Cited

U.S. PATENT DOCUMENTS

| | | | | |
|---|---|---|---|---|
| 1,940,316 A | * | 12/1933 | McKinley ................ 210/437 |
| 2,919,765 A | * | 1/1960 | Kasten ..................... 55/419 |
| 3,357,563 A | * | 12/1967 | Sicard ...................... 210/209 |
| 3,772,193 A | * | 11/1973 | Nelli et al. ................ 210/756 |
| 4,342,730 A | * | 8/1982 | Perrotta .................. 423/215.5 |
| 4,780,197 A | * | 10/1988 | Schuman .................. 210/136 |
| 5,580,448 A | * | 12/1996 | Brandreth, III ........... 210/206 |
| 5,783,067 A | * | 7/1998 | Belden ..................... 210/232 |
| 5,897,770 A | * | 4/1999 | Hatch et al. .............. 210/101 |
| 6,117,332 A | * | 9/2000 | Hatch et al. .............. 210/697 |
| 6,325,926 B1 | * | 12/2001 | Hansen .................... 210/209 |
| 6,416,662 B1 | * | 7/2002 | Schmidt ................. 210/198.1 |
| 6,475,379 B1 | * | 11/2002 | Jousset et al. ............. 210/91 |
| 6,626,299 B1 | * | 9/2003 | Brown et al. ............. 210/450 |

* cited by examiner

Primary Examiner—Fred G. Prince
(74) Attorney, Agent, or Firm—Schweitzer Cornman Gross & Bondell LLP

(57) ABSTRACT

A disposable filter cartridge for a pump-filter assembly having a one piece integral pump-filter housing. The filter cartridge includes opposed upper and lower end caps and a tubular skeletal core member open at both ends. A pleated filter medium surrounds the core member and is supported and retained between the opposed end caps. The end caps further include integral flexible gaskets dimensioned to engage pipe fittings of more than one size. A water treatment medium may be deposited within a central portion of the core member. In combination with the skeletal core, a platform means projects radially inwardly from the central core to form a cage-like structure adapted to support a variety of water treatment media. The entire filter cartridge is removable from the housing and may be replaced as desired.

4 Claims, 6 Drawing Sheets

US 7,005,062 B1

SELF-SUPPORTING PUMP-FILTER APPARATUS FOR ABOVE-GROUND SWIMMING POOLS

RELATED APPLICATION DATA

This is a nonprovisional application of provisional application Ser. No. 60/396,185, filed on Jul. 16, 2002, now abandoned, and co-pending provisional application Ser. No. 60/401,662, filed on Aug. 7, 2002.

FIELD OF INVENTION

The present invention relates to integrated above-ground swimming pool pump-filter combinations in general and to improved housings and replaceable cartridge filters for such combinations in particular.

BACKGROUND OF THE INVENTION

Integrated swimming pool pumps and filters for above-ground pools are known to the art. A representative example of such a combined pump and filter is disclosed in U.S. Pat. No. 4,022,690, in which the integrated pump and filter combination is directly supported on the side of an above-ground pool and in direct communication with the pool skimmer. Replaceable pool filter cartridges for use in association with swimming pools are illustrated in U.S. Pat. No. 5,211,846. Freestanding swimming pool filters through which swimming pool water may be passed for filtration are also known to the art and are shown, for example, in U.S. Pat. No. 6,217,754.

The present invention is directed to improvements in freestanding pump-filter apparatuses particularly suitable for above-ground pools.

SUMMARY OF THE PRESENT INVENTION

The new and improved combination pump-filter apparatus for above-ground pools includes a one-piece thermoplastic housing which is adapted to be freestanding and includes a broad base in which a swimming pool pump is mounted; a filter cartridge cavity disposed directly above the pump, in which a replaceable filter cartridge may be supported; and a top cover providing access to the filter cartridge for loading a disinfectant such as chlorine into the assembly as well as for removing and replacing the entire disposable filter cartridge. The housing also includes an inlet line at the top of the unit and an outlet or pool return line at the bottom of the unit.

For a more complete understanding of the present invention and the benefits to be derived therefrom, reference should be made to the accompanying drawings taken in conjunction with the following detailed description.

DETAILED DESCRIPTION OF THE INVENTION

Figure 1:
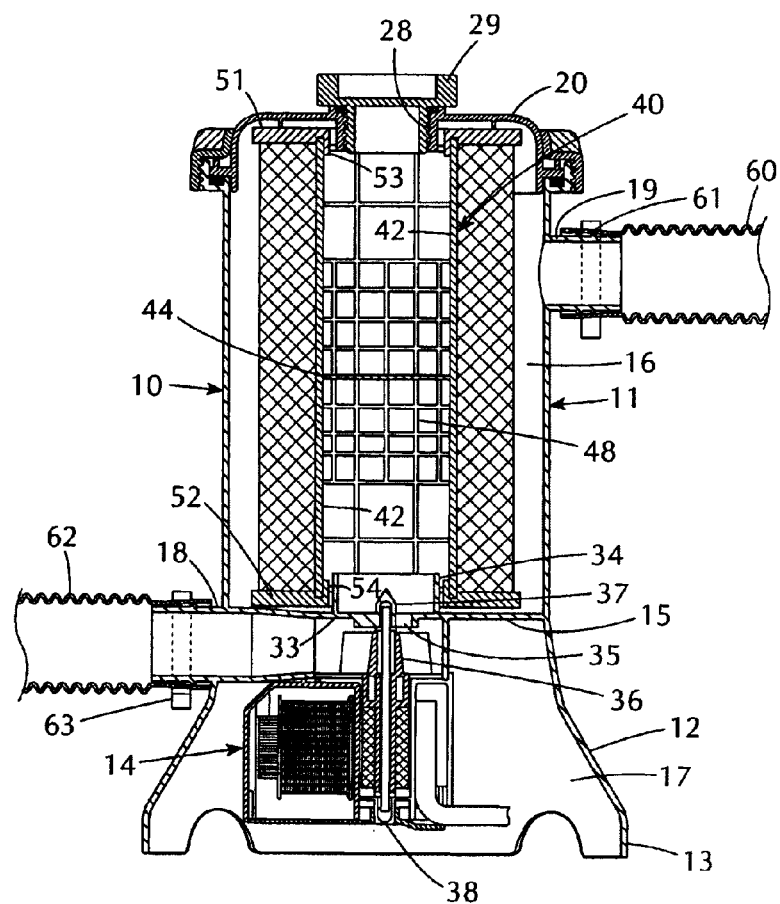
FIG. 1 is a cross-sectional view of the new and improved pump-filter assembly of the present invention, including the housing, the pump, and the filter cartridge.
Figure 2:
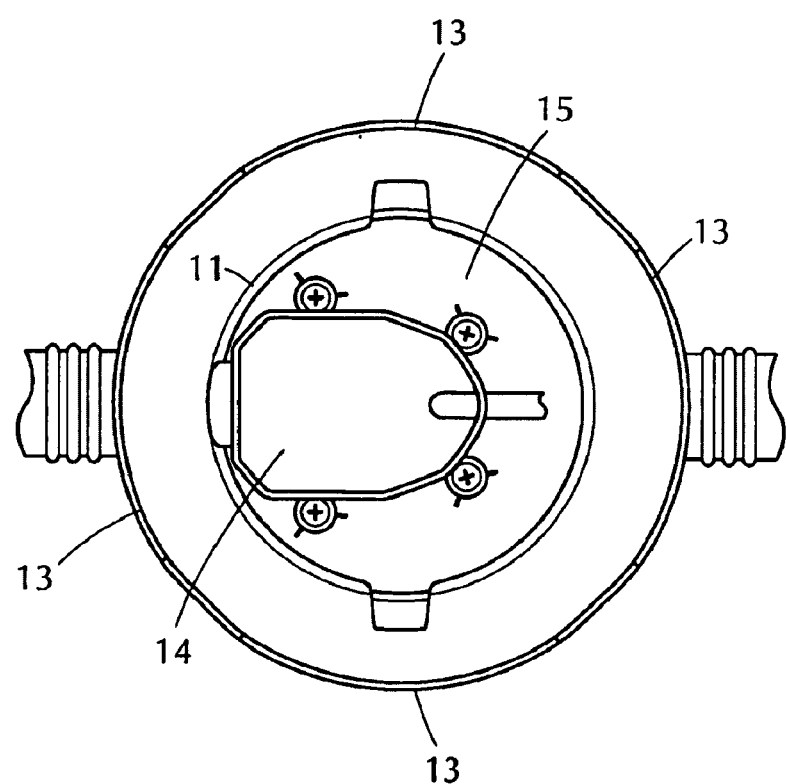
FIG. 2 is a bottom plan view of the assembly of FIG. 1.

Referring now to FIG. 1, the pump-filter assembly of the new invention includes a one piece thermoplastic housing 10 having a generally cylindrical upper portion 11 defining an inner pool cartridge filter cavity 16; and a lower, broadened base portion 12 having a series of feet 13 which generally support the entire housing. The base portion 12 includes a motor cavity 17 in which the pump motor 14 is supported. This arrangement provides a stabilized unit with a low center of gravity which is adapted to be free-standing adjacent an above-ground pool.

A transverse wall 15 separates the filter cartridge cavity 16 from the motor cavity 17. An integral outlet or pool return line 18 in the form of a generally cylindrical exit pipe extends outwardly of the housing 10 from immediately below the transverse wall 15, as shown. The upper portions of the return line 18 are integral with and a part of the transverse wall 15.

Figure 5:
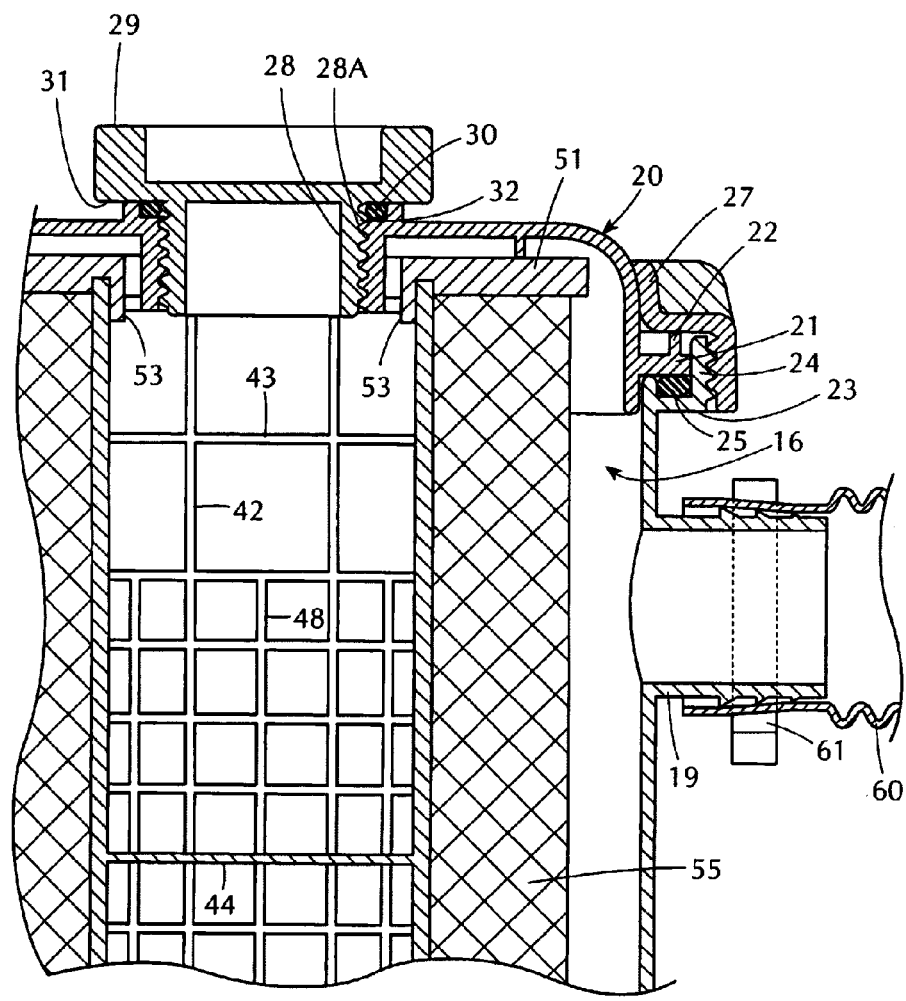
FIG. 5 is an enlarged cross-sectional view of the cover for the housing.

Towards the upper portions of the cartridge cavity 16, an inlet line 19 is formed integrally with the housing. A cover 20 in the form of a dome is provided to close off the upper portions of the housing. As shown in FIG. 5, the cover 20 has a circumscribing horizontal rim 21 which supports a circumscribing boss 22. The top of the housing 10 includes a circumscribing U-shaped channel 23 having a vertical threaded wall portion 24. In accordance with the invention, the cover 20 is seated over the groove 25 into which a sealing O-ring 26 is disposed. A locking ring 27 is adapted to fit over the cover 20, as shown. The locking ring 27 has a threaded internal portion to engage the threads on the uppermost portion of the housing, as will be understood.

The cover 20 itself has a threaded cylinder 28 with central opening 28A which mounts therein a threaded cap 29. The outer walls of upper cylinder 28 and lower cylinder 34 (described hereinafter) are inserted within the caps 51, 52 of the filter cartridge. An O-ring gasket 30 is supported between the underside 31 of the cover 29 and the uppermost portion 32 of the cover 20. The pump motor 14 includes an impeller 32 which is disposed in an impeller housing 33 formed integrally with the exit line 18 of the assembly. A cylindrical entrance 34 is formed integrally in the wall 15 to permit pool water in the housing to enter into the impeller housing 33 through orifices 35 and out of the filter assembly by action of the rotation of the impeller 32, as will be understood. The impeller housing has an integral impeller shaft bearing 37 as shown to support shaft 38.

Figure 3:
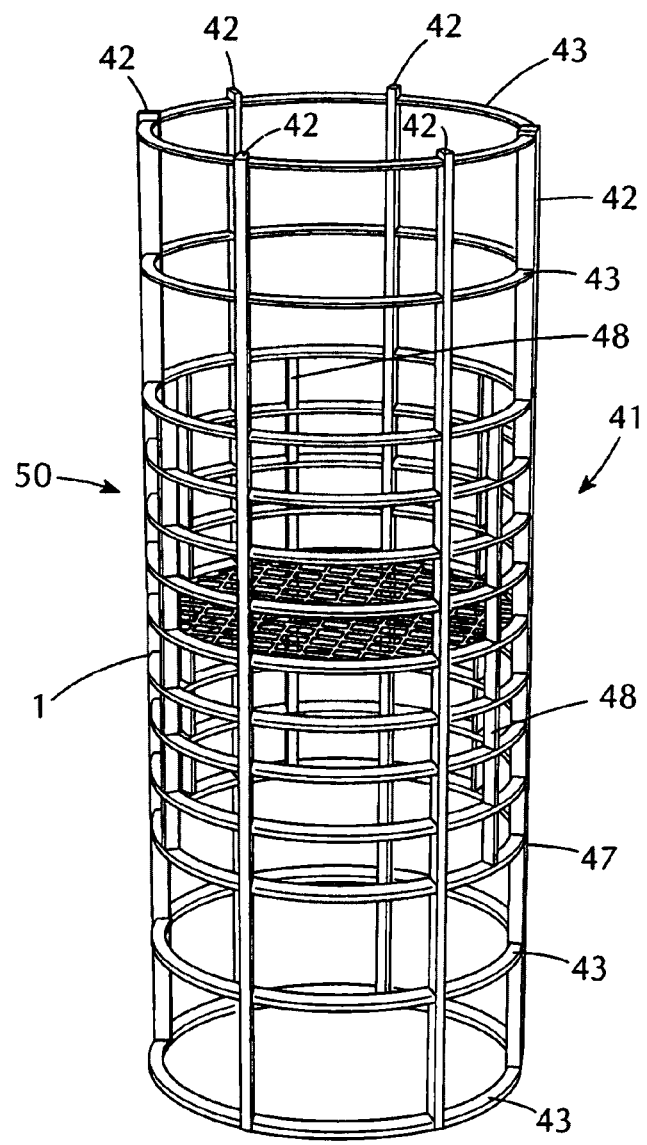
FIG. 3 is a perspective view of the core of the new and improved filter cartridge of the present invention.
Figure 4:
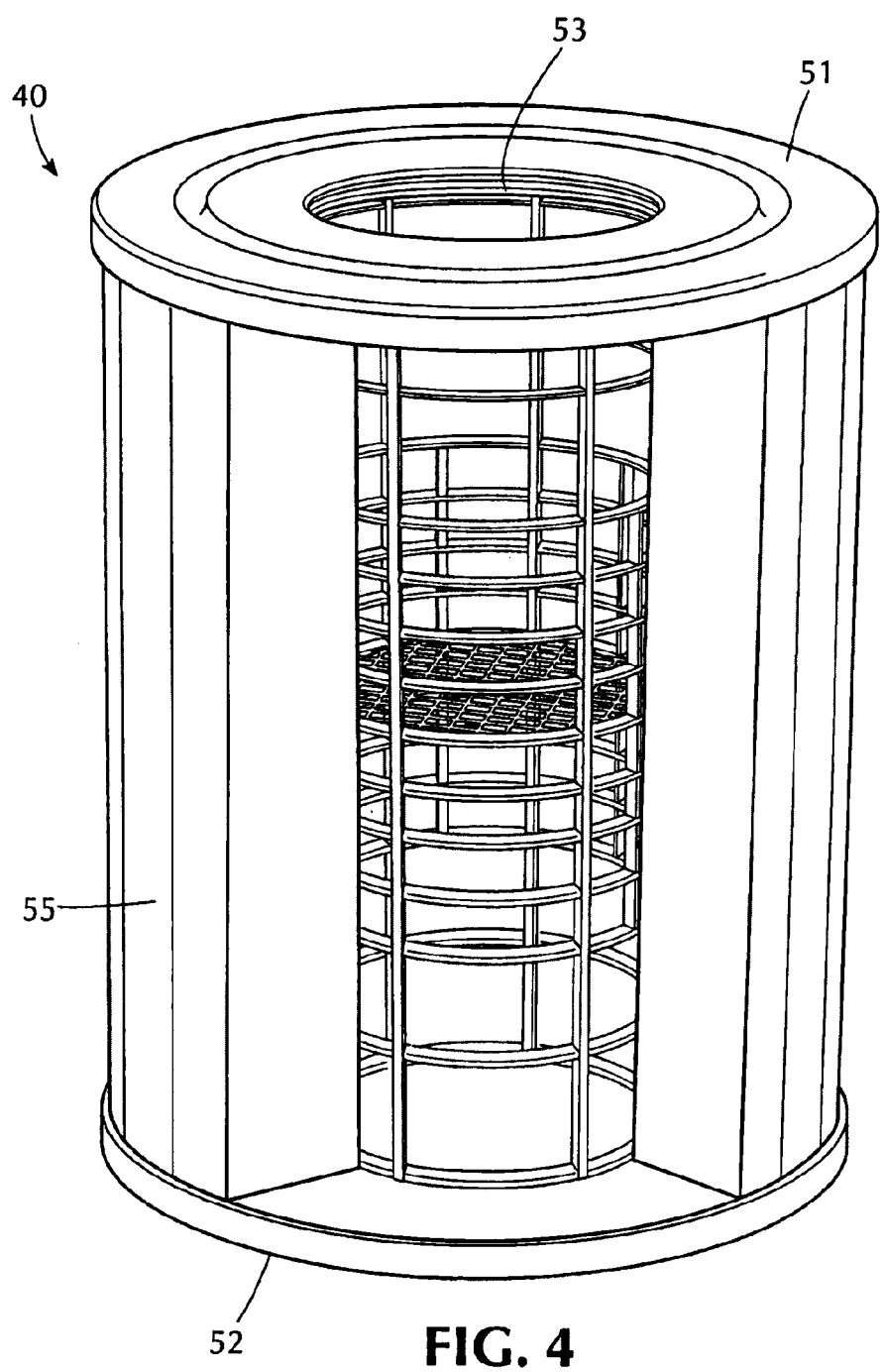
FIG. 4 is a perspective view of the new filter cartridge with parts cut away to show details of assembly.

In accordance with the invention, a new and improved filter cartridge 40 is provided. The filter cartridge, as shown in FIGS. 3 and 4, includes a unique skeletal core 41 comprising six full-depth vertical posts 42 supporting twelve rings 43. In accordance with the invention, a grid-like platform 44 is disposed centrally transversely of the core 41. An additional six short vertical posts 48 are provided between the posts 42 in the central portion of the core 41 to form a cage 50 in combination with the platform 44 for housing a water treatment medium, preferably chlorine. The cage 50 supports one or more chlorine tablets (not shown) for treating the pool water as it passes through the filter cartridge 40. Referring to FIG. 4, the filter cartridge 40 includes a top cap 51, which is generally disk shaped and a similarly shaped bottom cap 52. The caps 51 and 52 have opening flanges 53, 54 which engage and support the top and bottom of the core 41 as shown in FIG. 4. The end caps 51, 52 may be permanently attached to the core 41 by adhesive, by mechanical fasteners or threaded engagement, or by simply molding the end caps 51 and 52 directly over the core member 41. A pleated filtering medium 55 is supported between the end caps 51 and 52 and surrounding the entire core 41. The pleated filter medium 55 may be permanently attached to the end caps by molding the end caps about the filter medium and the central core 41 or it may be otherwise adhesively secured to the end caps or simply trapped therebetween.

Thus the new and improved disposable filter cartridge 40 has four elements, a top cap 51, a bottom cap 52, a central core 41, and a circumscribing filter medium 55. This arrangement provides for simple and efficient manufacture at modest cost. Accordingly, the filter cartridge may be replaced when the filter medium is spent by the absorption of impurities from circulating water.

Figure 6:
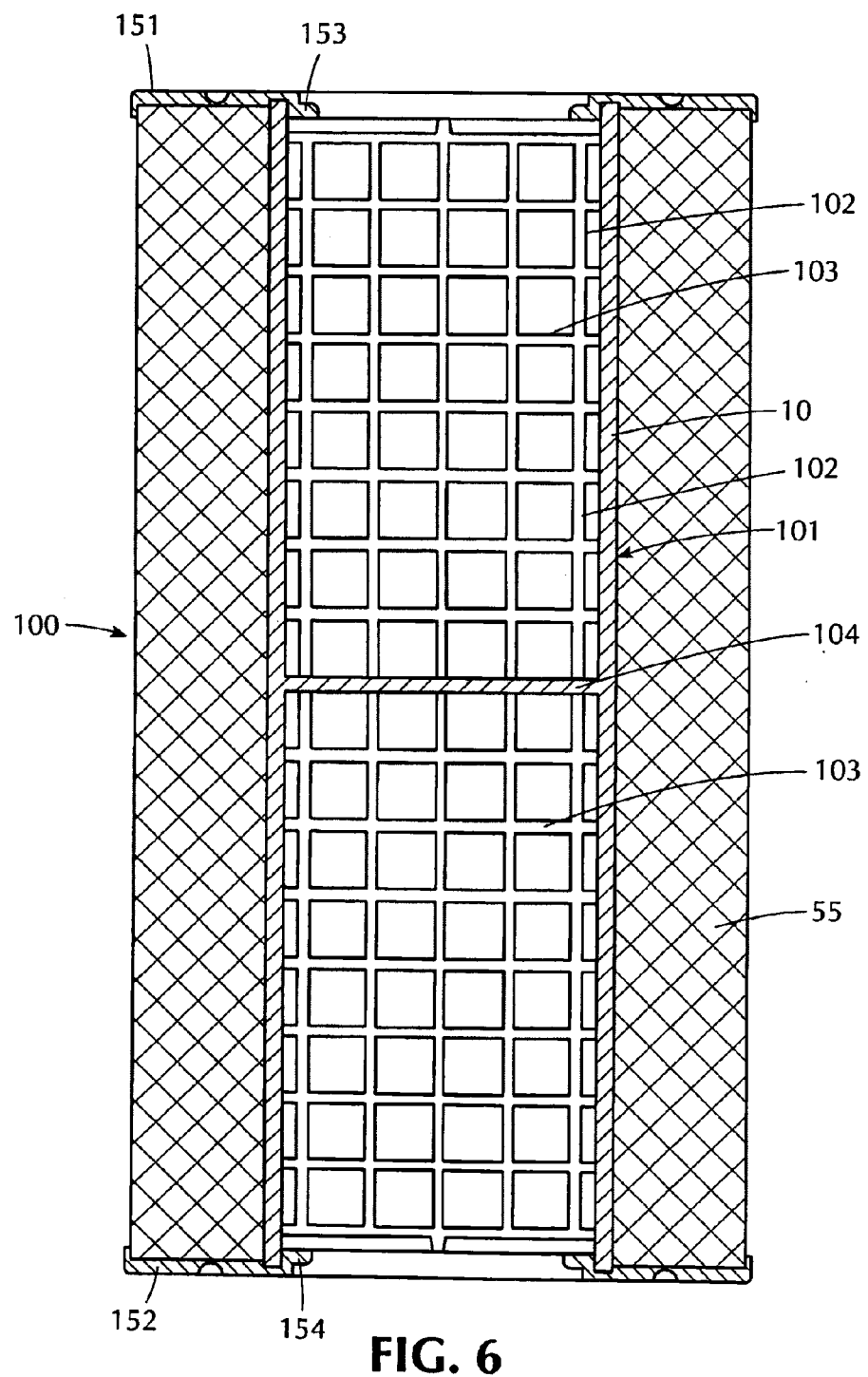
FIG. 6 is a cross-sectional view of a preferred embodiment of the filter cartridge.

A preferred embodiment of the filter cartridge is illustrated in FIG. 6 as cartridge 100. The cartridge 100 is generally similar to the above-described cartridge 40 in that it includes a skeletal core, a chlorine cage, top and bottom caps, and a pleated filter medium.

More specifically, the cartridge 100 includes a cylindrical cover 101 having vertical and horizontal members 102, 103 corresponding in function to the elements 42, 43 and a platform 104 corresponding to the element 44.

Importantly, the cartridge 100 has end caps 151, 152 which correspond to caps 51, 52 in the function of retaining the filter medium 55 about the core and between the caps. The caps 151 and 152 further include integral flexible gaskets 153, 154 which are dimensioned to tightly receive and engage cylindrical fittings (such as 28, 34 described above) of a series of outer diameters. The gaskets provide a degree of universality to filter cartridges, enabling them to be used with pump fittings of different diameters, the gaskets 153, 154 being sufficiently flexible to engage more than one size fitting.

Advantageously, the provision of a chlorine cage 50 permits the chemical treatment of the water outside of the pool during the recirculation of pool water through the pump-filter housing.

In usage, the pump-filter assembly is installed in association with an above-ground pool by connecting the skimmer line of the pool to the inlet 19 by a hose 60 which is attached to the inlet 19 by clamp 61 in known fashion. The return line to the pool may be similarly installed by a hose 62 clamped to the outlet line 18 by a mechanical clamp 63.

Chlorine tablets (not shown) may be deposited into the cage by removing the cap 29 and depositing a suitable number of chlorine tablets. The chlorine supply may be periodically replenished, as will be understood, by removing the central cap 29. At greater intervals, the entire cartridge 40 itself may be replaced by unscrewing the housing cover 20, removing the cartridge, and inserting a new cartridge 40.

Although the foregoing description has been given by way of a preferred embodiment, it will be understood by those skilled in the art that other forms of the invention falling within the ambit of the following claims is contemplated. For example, the cage housed within the central core of the filter cartridge can accommodate any water treatment medium. Additionally, while the present invention is particularly suitable for use in connection with above-ground pools, it would be understood that the pump-filter apparatus described herein may be adapted for use in connection with any standing body of water. Accordingly, reference should be made to the following claims in determining the full scope of the invention.

What is claimed is:

1. A disposable filter cartridge for an integrated pump-filter assembly comprising:
   (a) opposed upper and lower end caps;
   (b) a tubular skeletal central core member open at both ends;
   (c) pleated filter medium surrounding said skeletal member and supported between said opposed end caps;
   (d) a substantially circular platform means disposed centrally transversely of said core, whereby said platform is adapted to support a water treatment medium; and
   e) said opposed end caps include flexible, integral gasket means adapted to engage fittings of more than one size extending within said core member.

2. The disposable filter cartridge as set forth in claim 1, wherein said water treatment medium includes at least one chlorine tablet.

3. The disposable filter cartridge as set forth in claim 1, wherein said skeletal core is comprised of a series of vertical post members disposed transversely in relation to a series of ring members, whereby said post and ring members, in combination with said platform, form a cage-like structure for holding said water treatment medium.

4. A disposable filter cartridge comprising:
   (a) opposed upper and lower end caps;
   (b) a tubular skeletal central core member open at both ends;
   (c) pleated filter medium surrounding said skeletal member and supported between said opposed end caps;
   (d) a substantially circular, grid-like platform means disposed centrally transversely of said core, whereby said platform is adapted to support a water treatment medium; and
   (e) said opposed end caps include flexible, integral gasket means adapted to engage fittings of more than one size extending within said core member.

* * * * *